J. WILKINSON.
DIAPHRAGM HORN.
APPLICATION FILED JAN. 15, 1916.

1,275,815.

Patented Aug. 13, 1918.

Inventor:
James Wilkinson,
by Albert G. Davis
His Attorney.

UNITED STATES PATENT OFFICE.

JAMES WILKINSON, OF PITTSFIELD, MASSACHUSETTS, ASSIGNOR TO GENERAL ELECTRIC COMPANY, A CORPORATION OF NEW YORK.

DIAPHRAGM-HORN.

1,275,815.   Specification of Letters Patent.   Patented Aug. 13, 1918.

Application filed January 15, 1916. Serial No. 72,231.

*To all whom it may concern:*

Be it known that I, JAMES WILKINSON, a citizen of the United States, residing at Pittsfield, county of Berkshire, State of Massachusetts, have invented certain new and useful Improvements in Diaphragm-Horns, of which the following is a specification.

The present invention relates to horns or signaling devices wherein a diaphragm is mechanically vibrated to produce the sound.

The object of the invention is to provide an improved mechanism for setting up the vibrations in the diaphragm.

For a consideration of what I believe to be novel and my invention, attention is directed to the accompanying specification and the claims appended thereto.

Figure 1:
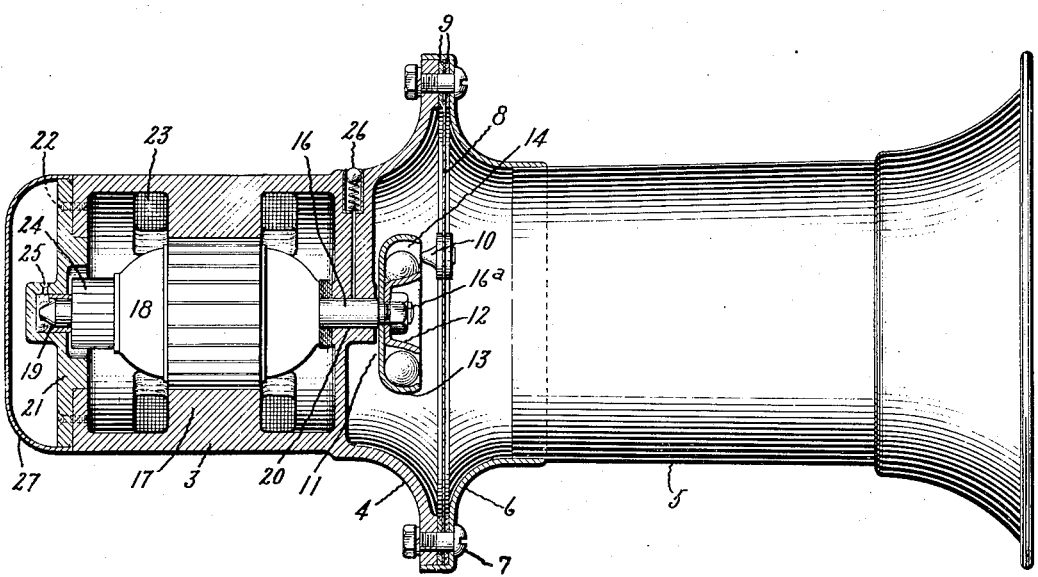
Figure 2:
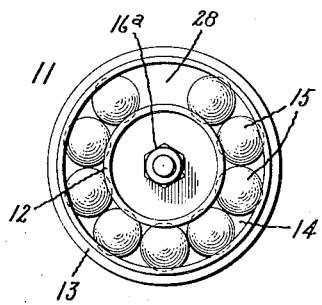

In the accompanying drawings, Figure 1 is a longitudinal vertical section through a signaling device embodying my invention, and Fig. 2 is a face view of the rotary actuating member.

Referring to the drawings, 3 indicates a casing having a flange 4, and 5 an amplifier having a flange 6. The two flanges are fastened together as by screw bolts 7 and clamp between them the diaphragm 8, suitable gaskets 9 being arranged on each side of the diaphragm between it and the flanges. Adjacent the center of the diaphragm is a button or projection 10 which is engaged by the actuator 11 to impart a vibratory movement to the diaphragm. The actuator comprises two cup-shaped retainers, an inner one 12 and an outer one 13 which are nested together and fastened at their centers. This forms between the cup-shaped retainers an annular groove or race 14 in which are placed a number of balls 15, preferably formed of steel. The walls of the retainer project well around the balls to retain them firmly and the groove or race 14 is of such axial depth as to permit the balls to fall back slightly so as to be out of the vertical plane of the tip of the button or projection 10, when the horn is not in operation. In the present instance the horn is shown as being of the electric motor type and I have accordingly shown the actuator 11 as being fixed directly to the end of the armature shaft 16 of the motor, the end of such shaft being threaded to receive a retaining nut 16ª. The motor is mounted in the casing 3, its poles 17 being preferably formed integral with the casing wall and its armature 18 being supported by the armature shaft 16 which runs in bearings 19 and 20. The bearing 19 is a cone ball bearing arranged to take the thrust of the armature shaft. It is carried in a plate 21 which is detachably fixed to the end of casing 3 by screws 22. 23 indicates the windings of the poles and 24 the commutator upon which brushes carried by a suitable holder run. The brushes and holder and the wiring connections do not show in the drawing but it will be understood that they will be of a usual type. 25 and 26 indicate oil holes for the shaft bearings and 27 a cap which slips over the end of casing 3 to keep out dirt and to give a finished appearance to the horn.

The number of balls placed in the race or groove 14 is preferably such that they do not entirely fill it in a circumferential direction but leave a space as indicated at 28, Fig. 2 therein. When the horn is not being operated this space will, of course, be at the top of the actuator and just opposite to the button or projection 10. By this arrangement the jarring of the horn cannot cause the balls to strike the button thus making a small noise which might be objectionable. This arrangement is of particular utility when the horn is being used on an automobile, as there is considerable vibration and jar when the car is running.

In a horn employing a series of balls for striking the diaphragm it is very essential that the balls be held firmly in place. By my improved structure I am enabled to have the edges of the walls forming the ball race come well around the balls since the button can project within the edges of the walls so that the balls are not required to project much beyond such edges. This also prevents any possibility of the balls unedging and becoming fast between the edges of the retainer. My arrangement also gives a good striking angle at the point of contact between the balls and the button.

The operation is as follows: When the motor is idle the balls drop back in the race and are out of the plane of the tip of the button 10. When the motor is started the balls are thrown forward by centrifugal force and wedge themselves against the edges of the actuator in which position they are in the path of the tip of the button 10 and by striking it cause the diaphragm to be actuated.

In horns of this general type to secure ruggedness and durability and to keep within reasonable limits as to size of horn, the diaphragm is necessarily small in diameter and must be of sufficient thickness to carry the impact button. The natural frequency of such a diaphragm is far higher than the frequency of the note required. It follows, therefore, that the actuator must have sufficient power to vibrate a very stiff diaphragm at some artificial speed. This means that the reactive force occasioned by the return movement of the diaphragm is considerable. By my arrangement it will be seen that the balls can yield circumferentially under the return swing of the diaphragm button, thus preventing the reactions reaching the armature.

Another advantage of my arrangement is that when the motor is stopped the balls fall away out of the path of the button, and only come into action after the motor has started and sufficient speed has been attained to throw them outward along the incline of the ball race. As a result, there is no starting load for the motor to overcome.

I have also found that the relative position of the diaphragm and actuator can vary over quite a range without affecting the volume of sound, this being due, I think, to the clearance back of the balls. I do not, therefore, need to provide any means for adjusting the motor longitudinally in relation to the diaphragm, which greatly simplifies and cheapens the structure, and renders it more easily assembled and tested.

Furthermore, by my improved structure I provide a horn from which I can obtain the two-tone effect, that is, a soft note and a loud one, which is much to be desired in a warning signal, particularly for automobile use. The soft note is obtained by the initial retarding of the balls due to their slip when starting as they will tend to be forced around the race by the button. This will be at lower speeds of the actuator before the balls have become wedged firmly outward against the edges of the retainer by centrifugal force. The loud tone is obtained when full speed is reached.

In the present instance I have shown the shaft of the motor as being at right angles to the plane of the diaphragm, and in line with its center, the button 10 being to one side of the center. It will be understood, however, that other arrangements may be used and that the motor shaft may be arranged parallel to the diaphragm if desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The combination with a diaphragm, of an actuator having an annular race therein, and balls loosely mounted in the race for vibrating the diaphragm.

2. The combination with a diaphragm having a projection thereon, of an actuator having an annular race therein, and balls loosely mounted in the race for engaging the projection to set up a forced vibration of the diaphragm.

3. In a signaling device, the combination of an amplifier, a diaphragm, and an actuator for the diaphragm comprising a member having an annular race therein, and balls loosely mounted in such race.

4. In a signaling device, the combination of an amplifier, a diaphragm having a projection thereon, an actuator for the diaphragm comprising two cup-shaped members fixed in nested relation to each other thus forming an annular race, and balls loosely mounted in said race; and means for rotating the actuator to bring the balls into engagemenet with the projection.

5. In a signaling device, the combination of an amplifier, a diaphragm, and an actuator for the diaphragm comprising a member having an annular race therein, and balls loosely mounted in said race, said race being of greater depth than the diameter of the balls.

6. In a horn, the combination with a diaphragm having a projection thereon, of an actuator comprising means forming an annular race and balls loosely mounted in said race, the number and size of the balls therein being such as not to entirely fill the race circumferentially.

7. In a horn, the combination of a diaphragm, an actuator adjacent thereto comprising a member having an annular race therein, and balls loosely mounted in said race; a projection on the diaphragm which extends within the edges of said race, and means for rotating the actuator.

8. In a horn, the combination of a diaphragm, an actuator therefor comprising a member parallel to the diaphragm and having an annular race in its face, balls in said race, the number and size of the balls being such as not to entirely fill the race circumferentially, and a projection on the diaphragm adjacent the upper side of the race.

9. In a motor driven electric horn, the combination of an amplifier, a diaphragm across one end thereof, a casing to which the amplifier is fastened, a motor journaled in the casing, an actuator carried by the motor comprising means forming an annular race, balls loosely mounted therein, the edge of the race projecting well around said balls, and a button on the diaphragm the tip of which projects within the edges of the race and which is adapted to be struck by the balls to force the diaphragm into vibration.

10. In a motor driven electric horn, the combination of an amplifier, a diaphragm across one end thereof, a casing to which the amplifier is fastened, a motor journaled in the casing, an actuator carried by the motor comprising means forming an annular race, balls therein, the edges of the race projecting well around said balls, said race being of such depth that the balls may fall back therein from the edges of the race, the number of balls in the race being such as not to entirely fill it circumferentially, and a projection on the diaphragm located at the upper side of the race.

11. An actuator for a diaphragm horn comprising a member having an annular race therein, and balls loosely mounted in the race.

12. An actuator for a diaphragm horn comprising two members fastened together at their central portions and forming between their peripheries an annular race, and balls loosely mounted in said race which are retained therein by the edges of the members.

In witness whereof, I have hereunto set my hand this thirteenth day of January, 1916.

JAMES WILKINSON.